July 30, 1968
YI SHENG LI ETAL
3,394,533
LIQUID-GAS SEPARATOR
Filed June 17, 1966
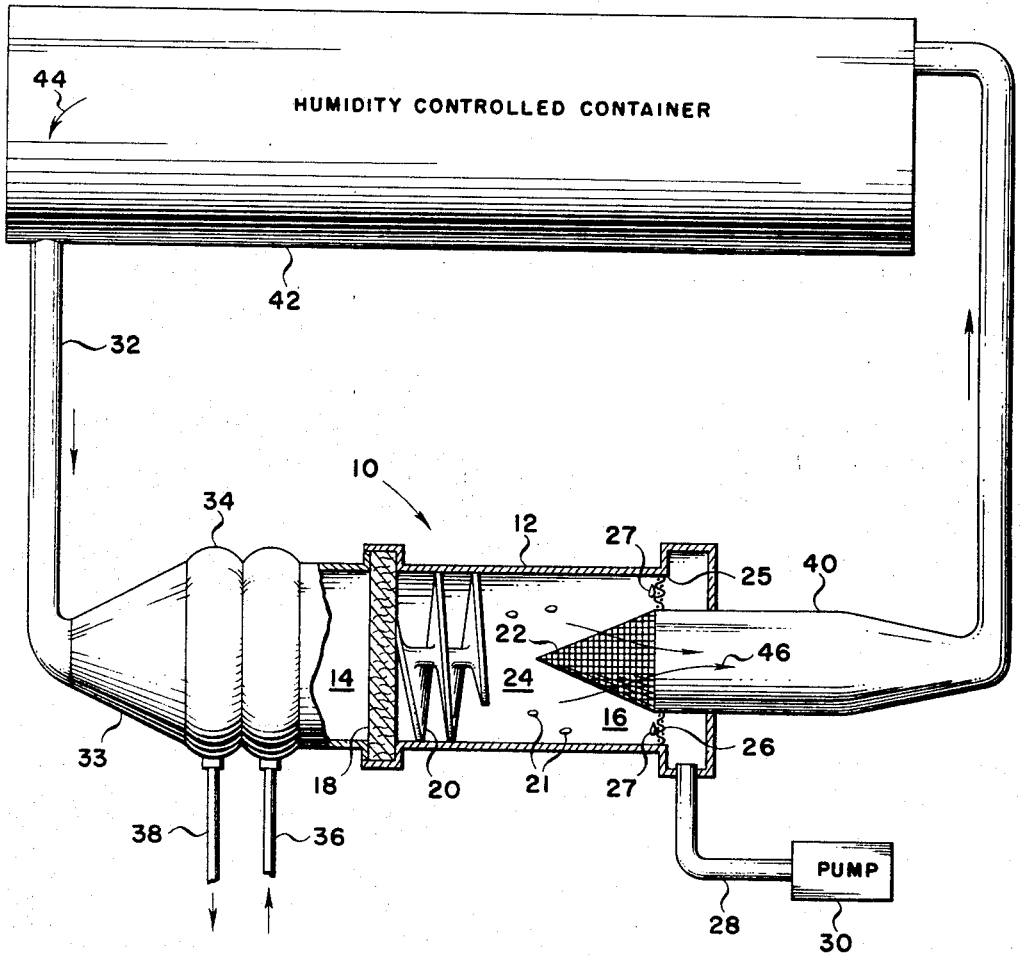
INVENTORS.
YI-SHENG LI
JAMES M. SMITH
THOMAS M. OLCOTT
BY
George C. Sullivan
Agent

United States Patent Office 3,394,533
Patented July 30, 1968

3,394,533
LIQUID-GAS SEPARATOR
Yi Sheng Li, San Mateo, James M. Smith, Saratoga, and Thomas M. Olcott, Sunnyvale, Calif., assignors to Lockheed Aircraft Corporation, Burbank, Calif.
Filed June 17, 1966, Ser. No. 558,313
8 Claims. (Cl. 55—337)

ABSTRACT OF THE DISCLOSURE

An apparatus for separating liquid and gas components of a fluid by the use of a cone-shaped non-wetting screen disposed in the path of the fluid flow. The ability to separate the fluid components with the apparatus permits it to be utilized in humidity controllable systems.

---

This invention relates to a separator for removing liquid from a gas as a means of controlling the liquid content thereof, and more particularly relates to an improved separator but humidity control and other systems in which a hydrophobic surface is employed to control the liquid and gas separation.

In the past many and various tyeps of devices have been developed for the separation of liquids and gases and particularly to separate water from an air stream where the water is considered detrimental to the atmospheric environment, but in many cases these formerly known devices were objectionably expensive in construction, incorporated elaborate arrangements or parts likely to become out of order or to create inefficient operation, and were objectionably bulky. Many prior art devices were bulky owing to the fact that they were rotating or reciprocating parts. Thus, the problem of removing suspended water from an air environment has long been recognized in the art, and various combinations of filter media have been proposed, but none of the known arrangements have provided the desired results, especially by means of a simplified and economical arrangement as is contemplated by the persent invention. In addition, prior art devices have not been able to provide the desired results in a zero or low gravity environment.

The present invention employs a novel, simplified arrangement of elements wherein a fluid stream, such as an air-stream containing water mist as an example, is first passed through a coalescent filter of a type known in the prior art and thence through a tortuous path in the form of a helical partition into a chamber having a conical-shaped hydrophobic screen element disposed along the path of the air stream at the exit of the chamber.

The incoming or circulating air is passed through the coalescer thereby producing miniature water droplets which are forced through the helical partition to create a spinning motion in such droplets as they are propelled into the cylindrical chamber whereupon they strike the surface of the conical-shaped hydrophobic screen with minimum contact therewith and are subsequently collected for removal from the chamber through at least one opening in the chamber near the exit end thereof through the use of a hydrophilic screen and sump arrangement capable of passing collected water without passing air. More particularly, as the water droplets encounter the surface of the hydrophobic screen they make physical contact with one another which causes the smaller droplets to merge into larger droplets such that they may be easily removed from the chamber under the action of a low-pressure condition downstream of the sump system.

An important feature of the present invention is the manner in which a helical path encountered by the air stream and water droplets is arranged so as to provide a spinning motion within the chamber to thereby provide a minimum of impact upon the cone-shaped hydrophobic screen thereby reducing the tendency of the water droplets to be forced through the screen which would be highly undesirable. Another important aspect of the present invention resides in maintaining a condition at the surface of the hydrophobic screen where the stagnation perssure differential developed at the apertuers in the screen results in a stable interface thereby preventing passage of the water droplets through the apertures.

It is accordingly the primary object of this invention to provide a reliable, practical and compact apparatus for removing liquid contained in fluid flow.

Another object of this invention is to provide an apparatus for removing only liquid from an air stream regardless of the small percent of liquid present in the air atmosphere.

A further object of this invention is to provide a water-air separator for removing water from a flowing air atmosphere utilizing a non-wetting element in the form of a hydrophobic member which may readily be removed for replacement in the instance of damage.

Still another object of this invention is to provide a water-air separator adapted to separate water from an air atmosphere where the water is coalesced to from fine droplets that accumulate at the exit end of the separator as larger water droplets and thence drained off through a sump system.

Other objects and many of the attendant advantages of this invention will be readily appreciated as the same becomes better understood by reference to the following detailed description when considered in connection with the accompanying drawing, wherein:

The figure is a longitudinal, sectional view of a system wherein a water-air separator constructed in accordance with the present invention is employed.

Referring to the drawing, there is shown in the figure a liquid-gas separator, hereinafter referred to simply as a water separator. The present water separator 10 comprises a cylindrical liquid-gas chamber 12 having an input end designated 14 and an output or exit end designated 16. The input end 14 has a coalescer filter 18 disposed perpendicular to the axis thereof with a helical path element 20 disposed adjacent thereto in axial alignment with the chamber and a substantially non-wetting screen element 22, which also may be defined as a fluid separation member, disposed along the axis of the chamber 12 thereof generally designated 24. At least one opening 25 is located at the output end of the chamber adjacent the exit end of the non-wetting screen 22 and has at least one hydrophilic screen element 26 disposed therein for the removal of water from chamber 24 along a drain line 28 with the use of a pump 30 connected to a remote end thereof. The foregoing cooperative elements will hereinafter be referred to as a sump system.

Associated with the water separator is a series-connected air inlet tube 32 and series-connected fan unit 33 and condensing heat exchanger 34 having cooling inlet and outlet connection 36 and 38, respectively, for providing circulating fluids to the heat exchanger. The water separator 10 is connected in series to the heat exchanger 34 at its input end 14 and at its output end 16 to an air outlet tube 40 which is in turn connected to the container 42 in which humidity is to be controlled, which is finally connected to the input end of air inlet tube 32, which completes the humidity control system illustrated in the figure.

The location of the sump system for the collection of the liquid removed from the air stream is more critical in a l.-g. environment than in a low-g. environment. Thus, in a l.-g. environment the sump system would be at the bottom of the water separator with no sump outlet at the top of the chamber as shown in the figure.

In operation the humidity control system shown in the figure is initiated by causing the circulation of an airstream from an opening in humidity controlled container 42 generally designated 44 by fan unit 33 which causes the air stream to pass through the condensing heat exchanger 34 where water condensation takes place in the form of a fine mist. The mixture of air and water mist is then passed through coalescer 18 made of a woven metal mat of a type known in the prior art, to ensure that the condensed moisture in the air stream becomes droplets upon leaving the coalescer. The droplets leaving the coalescer 18 next pass through helical partition member 20 which generates centrifugal forces or spinning motion upon the droplets to ensure that the water droplets 27 pass over the upper and lower hydrophilic screens 26 disposed downstream of the chamber and to ensure minimum impact of the water droplets 21 on the surface of the hydrophobic screen. As the air and water are separated from the incoming air-stream the air is routed back to the humidity-controlled container along direction 46 while the water is diverted to the hydrophilic sump system through the use of a pump 30. Water vapor added to the air stream in the chamber 42 constitutes the load on the humidity control system. It should be noted at this point that water vapor added to the system may for illustration purposes be that which is derived from the presence of a perspiring person in a closed spacecraft environment, in which case the water separator may be considered as part of an air conditioning system.

Another feature of the present invention noteworthy of discussion at this point is the matrix and configuration of hydrophobic screen 20. The screen 20 comprises a non-wetting surface formed of fine-mesh metal screen coated with tetrafluoroethylene of a form commonly known as "Teflon" which forms apertures of preselected critical size for the screen matrix. An analytical investigation of the non-wetting matrix surface reveals that the water separation efficiency of the non-wetting screen 20 is dependent upon the size of the apertures in the screen matrix. It has been found that the size of the liquid droplets of water should be greater than the screen porosities for protection against passage of water through the screen. The droplet size is controlled to a large extent in the present invention by the thickness and density of the coalescer 18.

Another factor which influences the passage of air through the screen 22 and not the water droplets is the velocity at which the droplets strike the screen. When liquid droplet contacts the hydrophobic screen 22 in a manner such that a liquid stagnation pressure is created, as long as the pressure difference developed across the screen results in a stable gas-liquid interface, the liquid droplet will not pass through the screen. The maximum velocity that a droplet may have and still be stopped by screen 22 is a function of the difference between stagnation and static pressures of the liquid droplets and may be related to one another by the following equation:

$$(\text{Stagnation pressure}) - (\text{Static pressure})$$
$$= P_{stag} - P_{stat} = \rho \frac{V^2}{2g_c} \quad \text{Eq. (1)}$$

where $\rho$ = liquid density
$V$ = approach velocity of the air stream
$g_c$ = gravitational constant Use of the foregoing equation is meaningful when the size of the droplets are such that the static pressure ($P_{stat}$) of the liquid in the drop will be equal to the pressure of the gas surrounding it, i.e., static pressure ($P_{stat}$) equals gas pressure ($P_g$). The pressure differential across a screen due to the impact of a water droplet can then be expressed by the following equation:

$$(\text{Liquid pressure}) - (\text{gas pressure}) =$$
$$P_L - P_g = \frac{\rho V^2}{2g_c} \cos \phi \quad \text{Eq. (2)}$$

where $\phi$ = angle between the normal of the screen surface and the direction of liquid gas flow.

The maximum stable pressure difference ($P_g - P_L$) that can be supported across either a hydrophobic or hydrophilic screen can be estimated by the following equation:

$$P_g - P_L = \frac{\sigma \cos}{r_h} \phi \quad (\text{Eq. (3)})$$

where
$\sigma$ = surface tension of the liquid to screen surface in pounds per inch
$\theta$ = contact angle in degrees of a liquid, such as water for example, makes with aperture of the screen matrix
$r_h$ = hydraulic radius, area per wetted perimeter of aperture in inches
$P_g$ = pressure on gas side of the screen in pounds per square inch
$P_L$ = pressure on liquid side of the screen in pounds per square inch Thus, from the foregoing Equation 3 it can be seen that if the maximum pressure difference at the surface of a screen is not exceeded air will pass through a hydrophobic screen while water will not and in the case of a hydrophilic screen water will be permitted to pass while air will not.

From the foregoing discussion it can readily be seen from the equations that the parameters of velocity and angle of impact of a water droplet on the hydrophobic screen 22 and the size of the apertures in the matrix are extremely important to the successful operation of the present invention. Consequently, the present invention contemplates the provision of a structural configuration and apparatus for controlling the parameters required for successful operation of a separator capable of utilization in a system for controlling the humidity thereof or the separation of liquids from gas.

More specifically, by way of example only, the following configuration and matrix arrangement for the hydrophobic screen 22 has been found to be satisfactory as a water separator. A screen such as hydrophobic screen 22 is constructed of stainless steel wire mesh of at least 325 mesh size, having a wire diameter of about 0.0014 inch which is coated substantially uniformly with a thin layer of Teflon on the order of 0.1 mil thick. The configuration of the screen 22 is in the form of a cone with the apex thereof in axial alignment with the cylindrical chamber 24, where the contact angle between the surface of the screen 22 and the axis of chamber 24 is on the order of 105 degrees. For this example, the air stream flow rate was on the order of 75 cubic feet per minute which produced a velocity of about 300 feet per minute for the water droplets generated within the system.

With the foregoing configuration, the screen 22 can withstand a pressure differential of about 7.6 inches of water which is sufficient to prevent the passage of water droplets through screen 22 as they leave helix member 20.

It should be noted that the illustrative hydrophobic screen is not to be limited to the Teflon-coated wire-mesh screen 22, but may also encompass a perforated Teflon member of preselected thickness and aperture size, a foam form of Teflon structure, or other non-wetting materials and forms which meet the pressure differential criteria discussed hereinabove with reference to Equations 1, 2 and 3. In addition, the use of air and water in the illustration of the present invention should not operate as a limitation since the basic invention encompasses liquid and gas mixtures to which Equations 1, 2 and 3 are applicable.

The water droplets which were collected at the output end of the screen 22 may be removed through the use of hydrophilic screen 26, which may be made from an uncoated stainless steel wire screen of about 325 mesh, and sump system including tube 28 and pump 30. The tube 28 leading away from the hydrophilic screen 26 is kept full of liquid to maintain a water-screen bond which prevents gas from passing through the hydrophilic sump system. The wetting properties of screen 26 may be determined by use of Equation 3 wherein $\theta$ is less than 90 degrees and the aperture size are consistent with Equation 3.

The present invention is useful not only as a means for controlling the humidity of a system, such as in an air-conditioning system, but has use in such situations where it is desirable to separate any liquid from a fluid stream. There is evidence for the belief that the present invention may be adapted for use in a weightless environment such as outer space. Uses such as the separation of urine in an air stream in a spaceship has readily desirable utility.

Other envisaged uses of the present invention concept and structure and arrangement thereof is the reclamation of oxygen from carbon dioxide ($CO_2$). This process involves the hydrogenation of $CO_2$ to water and carbon or hydrocarbon gases, whereupon the present water separator permits the water to be collected as one step in reclamation of the oxygen.

Another advantage of the present water separator resides in its small physical size and its attendant large water separation capacity. Use of the present invention reveals a separation efficiency on the order of 98 percent.

It should be understood that the conguration and specific arrangement of the water separation shown and described is intended to exemplify the principles of the invention and that various modifications may be made within the scope of the appended claims.

What is claimed as new is:

1. In a separator, the combination with a separator chamber provided with an inlet and outlet opening through which a fluid stream may pass containing liquid and gas, a coalescer mounted in the path of said inlet opening for precipitating minute liquid droplets in said fluid stream, a tortuous means mounted along the path of fluid flow to impart a whirling movement to said liquid droplets as they pass through said coalescer and enter said chamber, a hollow, closed-end, porous hydrophobic matrix formed of a stainless steel mesh covered with a thin uniform coat of Teflon forming apertures which are impervious to the passage of liquid but permit the passage of gas downstream of said tortuous means, and at least one porous hydrophilic screen disposed adjacent said outlet opening of said chamber formed of stainless steel mesh for the removal of liquid separated from the fluid stream.

2. In a separator recited in claim 1 wherein said hydrophobic matrix is further defined as conical-shaped secured about the periphery of its larger diameter around the outlet opening of said chamber having the other end thereof extending into said chamber along the path of the fluid stream.

3. In a separator recited in claim 2 wherein said hydrophobic matrix is further defined as having apertures on the order of 325 mesh and said hydrophilic screen having apertures on the order of 325 mesh.

4. A device for separating fluid flow into liquid and gas components, the combinations comprising (a) an enclosure having an axis, first and second ends along said axis and an imperforated wall surface, said enclosure having at least one opening at said first end thereof for receiving fluid flow along said axis and at least two outlet openings separated one from the other at said second end thereof for removing the liquid and gas components to be separated, (b) coalescer means disposed along said axis of said enclosure near said first end thereof, in the path of said fluid flow within said enclosure for precipitating minute liquid droplets from said fluid flow as it passes through said coalescer means, (c) helical means disposed along said axis adjacent said coalescer means in said path of said fluid flow after said fluid passes through said coalescer means within said enclosure to impart a spinning motion to said precipitated minute liquid droplets in said fliud flow, and (d) a cone-shaped non-wettable screen having a vertex and a base, said screen being disposed along said axis in axial alignment with said helical means at one of said outlet openings of said second end of said enclosure with said vertex extending toward said helical means to thereby permit the passage of the gas component of said fluid flow therethrough and to restrict the passage of the liquid component of said fluid flow for collection at said other outlet opening of said second end of said enclosure.

5. A device as recited in claim 4 wherein said cone-shaped non-wettable screen is defined as a screen, coated with Teflon, having a resulting surface with a plurality of apertures therein, said surface of said screen being defined by a cone wherein said axis passes through a vertex thereof and the surface is further defined by a moving straight line passing through said vertex and said straight line makes an angle on the order of 75° with said axis.

6. A device as recited in claim 5 wherein said cone-shaped non-wettable screen is further defined as having apertures therein of a hydraulic radius of the wetted perimeter which are on the order of less than 325 mesh.

7. In a system for separating a fluid into liquid and gas components having a source of fluid to flow therethrough, means adapted to circulate the fluid through the system and means for separating the fluid into liquid and gas components, said last mentioned means comprising (a) an enclosure having an axis, first and second ends along said axis and an imperforated wall surface, said enclosure having at least one opening at said first end thereof for receiving fluid flow along said axis and at least two outlet openings separated one from the other at said second end thereof for removing the liquid and gas components to be separated, (b) coalescer means disposed along said axis of said enclosure near said first end thereof, in the path of said fluid flow within said enclosure for precipitating minute droplets from said fluid flow as it passes through said coalescer means, (c) helical means disposed along said axis adjacent said coalescer means in said path of said fluid flow after said fluid passes through said coalescer means within said enclosure to impart a spinning motion to said precipitated minute liquid droplets in said fluid flow, and (d) a cone-shaped non-wettable screen having a vertex and a base, said screen being disposed along said axis in axial alignment with said helical means at one of said outlet openings of said second end of said enclosure, with said vertex extending toward said helical means to thereby permit the passage of the gas component of said fluid flow therethrough and to restrict the passage of the liquid component of said fluid flow for collection at said other outlet opening of said second end of said enclosure.

8. In a system as defined in claim 7 wherein said system is further defined as a humidity control system and said last-mentioned means is further defined as a screen having a plurality of apertures therein and being uniformly coated with a thin layer of Teflon such that the hydraulic radius of the wetted perimeter is on the order of less than 325 mesh and the surface of said screen is defined by a cone wherein said axis passes through a vertex thereof, and a surface thereof is further defined by a moving straight line passing through said vertex and said straight line makes an angle on the order of 75° with said axis.

References Cited

UNITED STATES PATENTS

| | | | |
|---|---|---|---|
| 1,751,915 | 3/1930 | Hall et al. | 55—322 |
| 2,429,751 | 10/1947 | Gohr et al. | 55—97 |
| 2,661,076 | 12/1953 | Walker. | |
| 2,673,446 | 3/1954 | Salardi | 55—456 |
| 2,823,760 | 2/1958 | Anderson. | |
| 2,835,340 | 3/1958 | McGuff et al. | |
| 2,848,060 | 8/1958 | McBride et al. | 55—325 |
| 2,934,166 | 4/1960 | Van Rossum | 55—482 |
| 3,066,462 | 12/1962 | Yap et al. | |
| 3,165,470 | 1/1965 | Giesse et al. | |
| 3,197,946 | 8/1965 | Taylor. | |
| 3,269,097 | 8/1966 | German | 55—337 |
| 3,329,130 | 7/1967 | Cochran | 55—337 |

HARRY B. THORNTON, *Primary Examiner.*

B. NOZICK, *Assistant Examiner.*